US008035335B2

(12) United States Patent
Duron et al.

(10) Patent No.: US 8,035,335 B2
(45) Date of Patent: Oct. 11, 2011

(54) ENERGY HARVESTING IN RFID SYSTEMS

(75) Inventors: Mark Duron, East Patchogue, NY (US); Russell Calvarese, Stony Brook, NY (US); Robert Sandler, Melville, NY (US); Thomas Wulff, North Patchogue, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 946 days.

(21) Appl. No.: 11/971,760

(22) Filed: Jan. 9, 2008

(65) Prior Publication Data

US 2009/0174361 A1 Jul. 9, 2009

(51) Int. Cl.
*H02J 7/00* (2006.01)
*H04B 1/16* (2006.01)
*H04M 1/00* (2006.01)
*G08B 23/00* (2006.01)

(52) U.S. Cl. ............... 320/101; 320/137; 455/343.1; 455/573; 340/693.1; 340/693.2

(58) Field of Classification Search .......... 320/101, 320/137; 340/693.1, 693.2; 455/343.1–343.6, 455/572

See application file for complete search history.

(56) References Cited

U.S. PATENT DOCUMENTS 7,268,517 B2 * 9/2007 Rahmel et al. ............... 320/101
7,598,792 B2 * 10/2009 Liu et al. ...................... 327/494
2007/0281760 A1 * 12/2007 Nikitin et al. .............. 455/575.2

* cited by examiner

*Primary Examiner* — Richard V Muralidar

(57) ABSTRACT

Methods, systems, and apparatuses for providing power to devices that are part of RFID systems are described. Energy is harvested at portable/mobile devices, stored and conditioned to provide on-going power as needed for various circuits/components. The energy may be generated in a variety of ways, including using a vibratory energy harvesting device, a magnetic energy harvesting device, and an optical energy harvesting devices.

5 Claims, 8 Drawing Sheets

ENERGY HARVESTING IN RFID SYSTEMS

BACKGROUND OF THE INVENTION

1. Field of the Invention

The invention relates to radio frequency identification (RFID) systems, and in particular, to harvesting energy in an RFID systems environment.

2. Background Art

Radio frequency identification (RFID) tags are electronic devices that may be affixed to items whose presence is to be detected and/or monitored. The presence of an RFID tag, and therefore the presence of the item to which the tag is affixed, may be checked and monitored wirelessly by devices known as "readers." Readers typically have one or more antennas transmitting radio frequency signals to which tags respond. Because the reader "interrogates" RFID tags, and receives signals back from the tags in response to the interrogation, the reader is sometimes termed a "reader interrogator" or simply "interrogator."

With the maturation of RFID technology, efficient communication between tags and interrogators has become a key enabler in supply chain management, especially in manufacturing, shipping, and retail industries, as well as in building security installations, healthcare facilities, libraries, airports, warehouses etc.

With the increased use of peripheral devices in RFID systems, it is becoming increasingly important to devise new ways to provide power to such devices. For example, a mobile computer with an integrated RFID interrogator may be used by an operator wearing a headset to communicate with the computer or a central communications point. A reader interrogator may be remote from a conventional power source, etc.

Thus, what is needed are improved ways of providing power to various devices included in RFID systems.

BRIEF SUMMARY OF THE INVENTION

The invention provides various techniques for harvesting power in the context of RFID systems. It also provides techniques for accumulating power harvested by various techniques and utilizing that power to operate various devices.

In exemplary embodiments, power is harvested by a device worn by an operator. One example of such a device is a headset. Power is harvested using various techniques/structures including: a solar array, an inertial harvesting device, a piezo energy harvester, and a charge pump.

There is provided a low voltage rectifier circuit for use in harvesting power from a variety of sources.

Power storage devices are provided for cumulating power derived from one or multiple sources.

In various embodiments, energy may be generated by a variety of energy harvesting devices, including a vibratory energy harvesting device, electromagnetic energy harvesting device, a magnetic energy harvesting device, a photo-optical energy harvesting device, a heat energy harvesting device, or a mechanical energy harvesting device.

In an embodiment, a vibratory energy harvesting device generates the energy from vibration of the mobile structure. For example, the vibratory energy harvesting device comprises a piezoelectric transducer. In an example implementation, a moment arm mounts the piezoelectric transducer. A capacitor is coupled to the energy storage device. Vibration of the arm causes the arm to deflect the piezoelectric transducer. The piezoelectric transducer generates a current due to the deflection. The current charges the capacitor.

In another example aspect, a magnetic energy harvesting device generates the energy from magnetism related to the movement of the mobile structure.

In a further example aspect, the magnetic energy harvesting device includes a magnet and a coil. The energy is generated by movement of the magnet with respect to the coil.

In another example aspect, an photo-optical energy harvesting device includes an photo-optical-to-electrical transducer that converts light received at the mobile structure into energy.

In another example aspect, a heat energy harvesting device converts heat generated by operation of the mobile structure into energy.

In another example aspect, a mechanical energy harvesting device converts friction due to operation of the mobile structure into energy. In another example aspect, the mechanical energy harvesting device uses a rotational wheel mechanism that rotates due to movement of the mobile structure to generate energy.

These and other objects, advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the invention and, together with the description, further serve to explain the principles of the invention and to enable a person skilled in the pertinent art to make and use the invention.

In the drawings, like reference numbers indicate identical or functionally similar elements.

Additionally, references numbers which are the same, but vary by virtue of an appended letter of the alphabet (for example, 412, 412R, 412P, 412S) or an appended letter and number (for example, 412, 412S1, 412S2) indicate elements which may be substantially the same or similar, but represent variations or modifications of the basic element. In some cases, the reference number without the appended letter or without the appended letter and number (for example, 412) may indicate a generic form of the element, while reference numbers with an appended letter or an appended letter and number (for example, 412S, 412S1, 412S2, 412P) may indicate a more particular or modified form of the element.

Generally, the leftmost digit(s) of a reference number identifies the drawing in which the reference number first appears. For example, an element labeled 412 typically indicates that the element first appeared in FIG. 4.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Introduction

Power arrangements for RFID system components are described herein.

Supplying power to RFID system devices located in real world installations can be difficult, particularly for mobile devices. Providing cabled power to a user of an RFID system "in the field" may be problematic. The power cable may be damaged by wear associated with the movement and actuation of the structure A battery may be mounted to the mobile structure to avoid the need for a power cable. However, RFID devices may require a large amount of power to carry out their functions, and thus require regular recharging/changing of batteries.

The invention provides various techniques for harvesting power in the context of RFID systems. It also provides techniques for cumulating power harvested by various techniques and utilizing that power to operate various devices.

In exemplary embodiments, power is harvested by a headset worn by an operator. Power is harvested using various techniques/structures including: RF signal transmitted by an RFID interrogator, solar array, inertial harvesting device, and piezo energy harvester.

There is provided a low voltage rectifier circuit for use in harvesting power from a variety of sources.

Power storage devices are provided for cumulating power derived from one or multiple sources.

In aspects, the energy may be generated by a variety of energy harvesting devices, including a vibratory energy harvesting device, a magnetic energy harvesting device, an optical energy harvesting device, a heat energy harvesting device, or a mechanical energy harvesting device.

In an example aspect, a vibratory energy harvesting device generates the energy from vibration of the mobile structure during operation of the mobile structure.

In a further example aspect, the vibratory energy harvesting device comprises a piezoelectric transducer. In an example implementation, a moment arm mounts the piezoelectric transducer. A capacitor is coupled to the energy storage device. Vibration of the arm causes the arm to deflect the piezoelectric transducer. The piezoelectric transducer generates a current due to the deflection. The current charges the capacitor.

In another example aspect, a magnetic energy harvesting device generates the energy from magnetism related to the movement of the mobile structure.

In a further example aspect, the magnetic energy harvesting device includes a magnet and a coil. The energy is generated by movement of the magnet with respect to the coil.

In another example aspect, an optical energy harvesting device includes an optical-to-electrical transducer that converts light received at the mobile structure into energy.

In another example aspect, a heat energy harvesting device converts heat generated by operation of the mobile structure into energy.

In another example aspect, a mechanical energy harvesting device converts friction due to operation of the mobile structure into energy. In another example aspect, the mechanical energy harvesting device uses a rotational wheel mechanism that rotates due to movement of the mobile structure to generate energy.

Embodiments of the present invention overcome problems with powering readers present in conventional systems. For example, according to embodiments, energy is generated on the mobile structure on which the reader is disposed, such as in the form of electrical energy. The energy is stored on the mobile structure, and used to power the reader. In this manner, the need for replacement of batteries, battery charging cycle times, power cables, and/or extremely large batteries is reduced or eliminated.

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "down," "top," "bottom," "vertical," "horizontal," etc.) used herein are for purposes of illustration only, and that practical implementations of the structures described herein can be spatially arranged in any orientation or manner.

In the following description, numerous specific details are set forth in order to provide a thorough understanding of the invention. However, it will be apparent to those skilled in the art that the invention, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Exemplary Operating Environment

Figure 1:
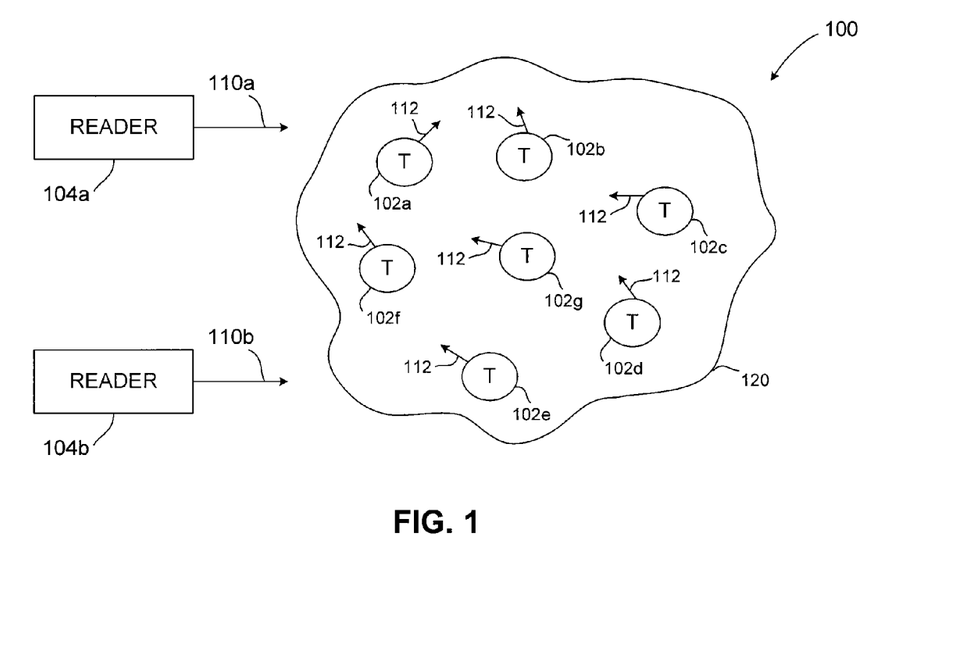
FIG. 1 shows an environment where RFID readers (interrogators) communicate with an exemplary population of RFID tags.

Before describing embodiments of the invention in detail, it is helpful to describe an example RFID communications environment in which the inventions may be implemented. FIG. 1 illustrates an environment 100 where RFID tag readers 104 (readers 104a and 104b shown in FIG. 1) communicate with an exemplary population 120 of RFID tags 102. As shown in FIG. 1, the population 120 of tags includes seven tags 102a-102g. A population 120 may include any number of tags 102.

Environment 100 includes any number of one or more readers 104. For example, environment 100 includes a first reader 104a and a second reader 104b. Readers 104a and/or 104b may be requested by an external application to address the population of tags 120. Alternatively, reader 104a and/or reader 104b may have internal logic that initiates communication, or may have a trigger mechanism that an operator of a reader 104 uses to initiate communication. Readers 104a and 104b may also communicate with each other in a reader network (see FIG. 2).

As shown in FIG. 1, reader 104a "reads" tags 120 by transmitting an interrogation signal 110a to the population of tags 120. Interrogation signals may have signal carrier frequencies or may comprise a plurality of signals transmitted in a frequency hopping arrangement. Readers 104a and 104b typically operate in one or more of the frequency bands allotted for this type of RF communication. For example, the Federal Communication Commission (FCC) defined frequency bands of 902-928 MHz and 2400-2483.5 MHz for certain RFID applications.

Tag population 120 may include tags 102 of various types, such as, for example, various classes of tags as enumerated above. Thus, in response to interrogation signals, the various tags 102 may transmit one or more response signals 112 to an interrogating reader 104. Some of the tags, for example, may respond by alternatively reflecting and absorbing portions of signal 104 according to a time-based pattern or frequency. This technique for alternatively absorbing and reflecting signal 104 is referred to herein as backscatter modulation. Typically, such backscatter modulation may include one or more alpha-numeric characters that uniquely identify a particular tag. Readers 104a and 104b receive and obtain data from response signals 112, such as an identification number of the responding tag 102. In the embodiments described herein, a reader may be capable of communicating with tags 102 according to various suitable communication protocols, including Class 0, Class 1, EPC Gen 2, other binary traversal protocols and slotted aloha protocols, and any other protocols mentioned elsewhere herein, and future communication protocols. Additionally, tag population 120 may include one or more tags having the packed object format described herein and/or one or more tags not using the packed object format (e.g., standard ISO tags).

Figure 2:
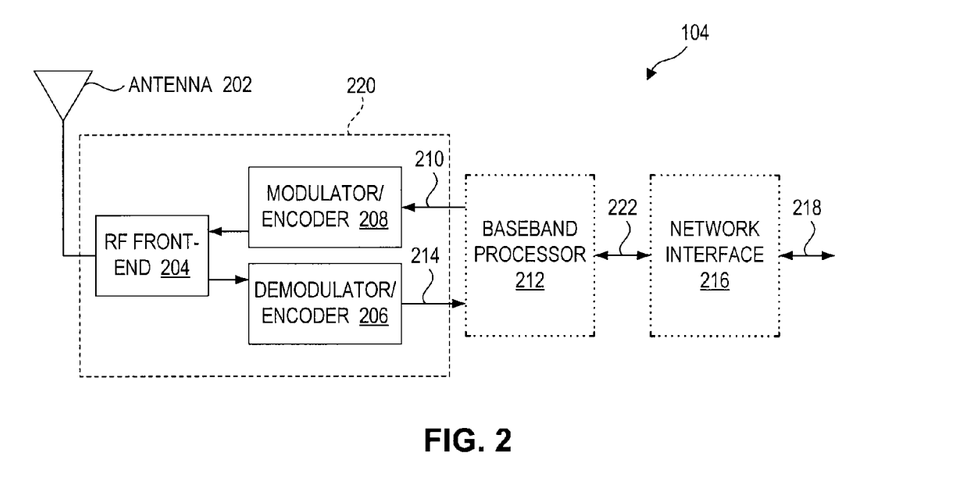
FIG. 2 is a block diagram of receiver and transmitter portions of an RFID reader.

FIG. 2 shows a block diagram of an example RFID reader 104. Reader 104 includes one or more antennas 202, a receiver and transmitter portion 220 (also referred to as transceiver 220), a baseband processor 212, and a network interface 216. These components of reader 104 may include software, hardware, and/or firmware, or any combination thereof, for performing their functions.

Baseband processor 212 and network interface 216 are optionally present in reader 104. Baseband processor 212 may be present in reader 104, or may be located remote from reader 104. For example, in an embodiment, network interface 216 may be present in reader 104, to communicate between transceiver portion 220 and a remote server that includes baseband processor 212. When baseband processor 212 is present in reader 104, network interface 216 may be optionally present to communicate between baseband processor 212 and a remote server. In another embodiment, network interface 216 is not present in reader 104.

In an embodiment, reader 104 includes network interface 216 to interface reader 104 with a communications network 218. As shown in FIG. 2, baseband processor 212 and network interface 216 communicate with each other via a communication link 222. Network interface 216 is used to provide an interrogation request 210 to transceiver portion 220 (optionally through baseband processor 212), which may be received from a remote server coupled to communications network 218. Baseband processor 212 optionally processes the data of interrogation request 210 prior to being sent to transceiver portion 220. Transceiver 220 transmits the interrogation request via antenna 202.

Reader 104 has at least one antenna 202 for communicating with tags 102 and/or other readers 104. Antenna(s) 202 may be any type of reader antenna known to persons skilled in the relevant art(s), including for example and without limitation, a vertical, dipole, loop, Yagi-Uda, slot, and patch antenna type.

Transceiver 220 receives a tag response via antenna 202. Transceiver 220 outputs a decoded data signal 214 generated from the tag response. Network interface 216 is used to transmit decoded data signal 214 received from transceiver portion 220 (optionally through baseband processor 212) to a remote server coupled to communications network 218. Baseband processor 212 optionally processes the data of decoded data signal 214 prior to being sent over communications network 218.

In embodiments, network interface 216 enables a wired and/or wireless connection with communications network 218. For example, network interface 216 may enable a wireless local area network (WLAN) link (including a IEEE 802.11 WLAN standard link), a BLUETOOTH link, and/or other types of wireless communication links. Communications network 218 may be a local area network (LAN), a wide area network (WAN) (e.g., the Internet), and/or a personal area network (PAN).

In embodiments, a variety of mechanisms may be used to initiate an interrogation request by reader 104. For example, an interrogation request may be initiated by a remote computer system/server that communicates with reader 104 over communications network 218. Alternatively, reader 104 may include a finger-trigger mechanism, a keyboard, a graphical user interface (GUI), and/or a voice activated mechanism with which a user of reader 104 may interact to initiate an interrogation by reader 104.

In the example of FIG. 2, transceiver portion 220 includes a RF front-end 204, a demodulator/decoder 206, and a modulator/encoder 208. These components of transceiver 220 may include software, hardware, and/or firmware, or any combination thereof, for performing their functions. Example description of these components is provided as follows.

Modulator/encoder 208 receives interrogation request 210, and is coupled to an input of RF front-end 204. Modulator/encoder 208 encodes interrogation request 210 into a signal format, such as, for example, one of pulse-interval encoding (PIE), FM0, or Miller encoding formats, modulates the encoded signal, and outputs the modulated encoded interrogation signal to RF front-end 204.

RF front-end 204 may include one or more antenna matching elements, amplifiers, filters, an echo-cancellation unit, a down-converter, and/or an up-converter. RF front-end 204 receives a modulated encoded interrogation signal from modulator/encoder 208, up-converts (if necessary) the interrogation signal, and transmits the interrogation signal to antenna 202 to be radiated. Furthermore, RF front-end 204 receives a tag response signal through antenna 202 and down-converts (if necessary) the response signal to a frequency range amenable to further signal processing.

Demodulator/decoder 206 is coupled to an output of RF front-end 204, receiving a modulated tag response signal from RF front-end 204. In an EPC Gen 2 protocol environment, for example, the received modulated tag response signal may have been modulated according to amplitude shift keying (ASK) or phase shift keying (PSK) modulation techniques. Demodulator/decoder 206 demodulates the tag response signal. For example, the tag response signal may include backscattered data formatted according to FM0 or Miller encoding formats in an EPC Gen 2 embodiment. Demodulator/decoder 206 outputs decoded data signal 214.

The configuration of transceiver 220 shown in FIG. 2 is provided for purposes of illustration, and is not intended to be limiting. Transceiver 220 may be configured in numerous ways to modulate, transmit, receive, and demodulate RFID communication signals, as would be known to persons skilled in the relevant art(s).

Figure 3:
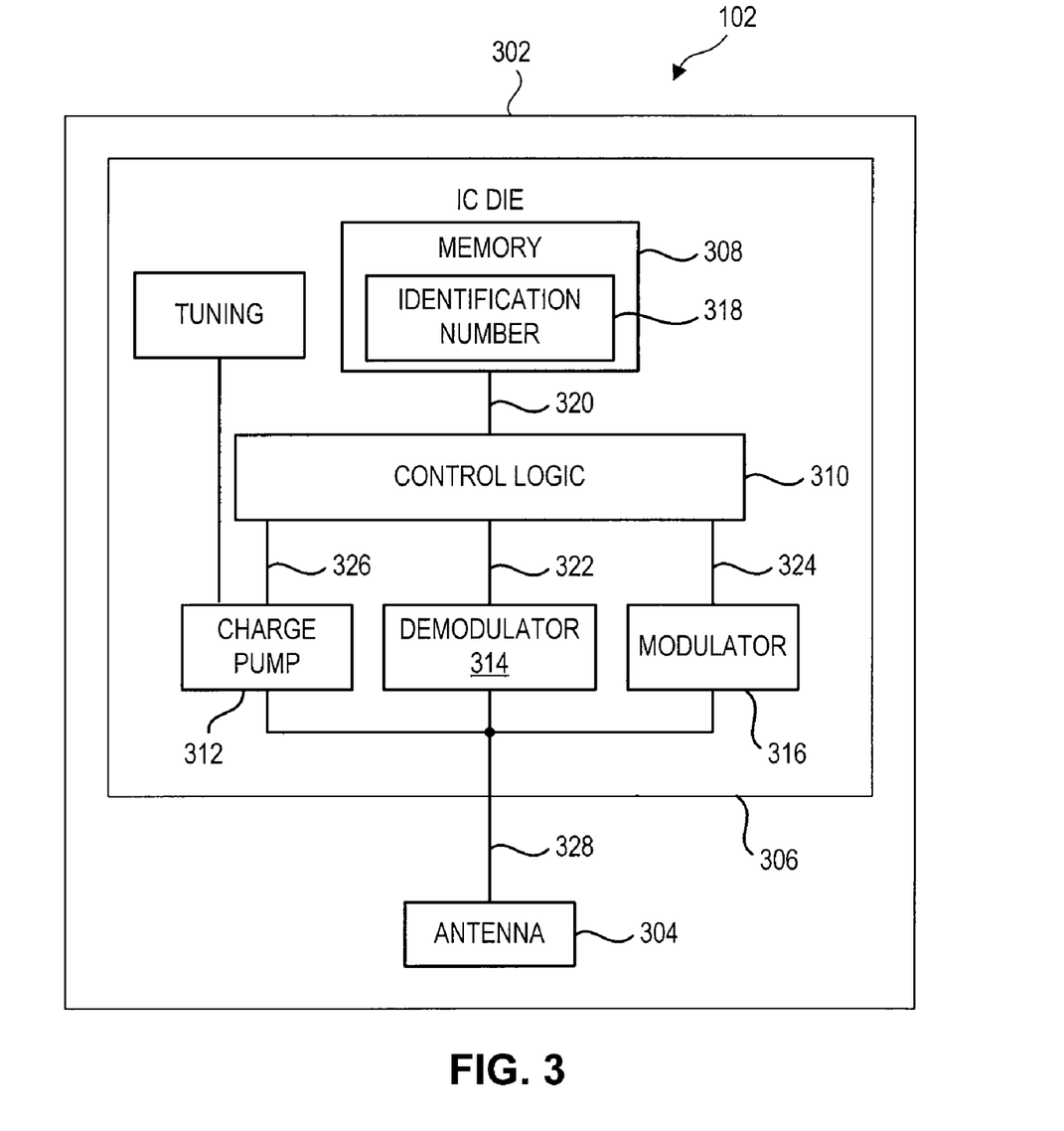
FIG. 3 is a block diagram of an exemplary radio frequency identification (RFID) tag.

The invention described herein is applicable to any type of RFID tag, with suitable additional features, as described in further detail below in conjunction with FIG. 4 and beyond. FIG. 3 is a schematic block diagram of an example radio frequency identification (RFID) tag 102 as already known to those practiced in the art. Tag 102 includes a substrate 302, an antenna 304, and an integrated circuit (IC) 306. Antenna 304 is formed on a surface of substrate 302. Antenna 304 may include any number of one, two, or more separate antennas of any suitable antenna type, including for example dipole, loop, slot, and patch. IC 306 includes one or more integrated circuit chips/dies, and can include other electronic circuitry. IC 306 is attached to substrate 302, and is coupled to antenna 304. IC 306 may be attached to substrate 302 in a recessed and/or non-recessed location.

IC 306 controls operation of tag 102, and transmits signals to, and receives signals from RFID readers using antenna 304. In the example of FIG. 3, IC 306 includes a memory 308, a control logic 310, a charge pump 312, a demodulator 314, and a modulator 316. Inputs of charge pump 312, and demodulator 314, and an output of modulator 316 are coupled to antenna 304 by antenna signal 328.

Demodulator 314 demodulates a radio frequency communication signal (e.g., interrogation signal 110) on antenna signal 328 received from a reader by antenna 304. Control logic 310 receives demodulated data of the radio frequency communication signal from demodulator 314 on an input signal 322. Control logic 310 controls the operation of RFID tag 102, based on internal logic, the information received from demodulator 314, and the contents of memory 308. For example, control logic 310 accesses memory 308 via a bus 320 to determine whether tag 102 is to transmit a logical "1" or a logical "0" (of identification number 318) in response to a reader interrogation. Control logic 310 outputs data to be transmitted to a reader (e.g., response signal 112) onto an output signal 324. Control logic 310 may include software, firmware, and/or hardware, or any combination thereof. For example, control logic 310 may include digital circuitry, such as logic gates, and may be configured as a state machine in an embodiment.

Modulator 316 is coupled to antenna 304 by antenna signal 328, and receives output signal 324 from control logic 310. Modulator 316 modulates data of output signal 324 (e.g., one or more bits of identification number 318) onto a radio frequency signal (e.g., a carrier signal transmitted by reader 104) received via antenna 304. The modulated radio frequency signal is response signal 112 (see FIG. 1), which is received by reader 104. In one example embodiment, modulator 316 includes a switch, such as a single pole, single throw (SPST) switch. The switch is configured in such a manner as to change the return loss of antenna 304. The return loss may be changed in any of a variety of ways. For example, the RF voltage at antenna 304 when the switch is in an "on" state may be set lower than the RF voltage at antenna 304 when the switch is in an "off" state by a predetermined percentage (e.g., 30 percent). This may be accomplished by any of a variety of methods known to persons skilled in the relevant art(s).

Charge pump 312 (or other type of power generation module) is coupled to antenna 304 by antenna signal 328. Charge pump 312 receives a radio frequency communication signal (e.g., a carrier signal transmitted by reader 104) from antenna 304, and generates a direct current (DC) voltage level that is output on tag power signal 326. Tag power signal 326 powers circuits of IC die 306, including control logic 320.

Charge pump 312 rectifies a portion of the power of the radio frequency communication signal of antenna signal 328 to create a voltage power. Charge pump 312 increases the voltage level of the rectified power to a level sufficient to power circuits of IC die 306. Charge pump 312 may also include a regulator to stabilize the voltage of tag power signal 326. Charge pump 312 may be configured in any suitable way known to persons skilled in the relevant art(s). For description of an example charge pump applicable to tag 102, refer to U.S. Pat. No. 6,734,797, titled "Identification tag Utilizing Charge Pumps for Voltage Supply Generation and Data Recovery," which is incorporated by reference herein in its entirety. Alternative circuits for generating power in a tag, as would be known to persons skilled in the relevant art(s), may be present. Further description of charge pump 312 is provided below.

It will be recognized by persons skilled in the relevant art(s) that tag 102 may include any number of modulators, demodulators, charge pumps, and antennas. Tag 102 may additionally include further elements, including an impedance matching network and/or other circuitry. Furthermore, although tag 102 is shown in FIG. 3 as a passive tag, tag 102 may alternatively be an active tag (e.g., powered by a battery, not shown).

Memory 308 is typically a non-volatile memory, but can alternatively be a volatile memory, such as a DRAM. Memory 308 stores data, including an identification number 318. In a Gen-2 tag, tag memory 308 may be logically separated into four memory banks.

As further described below, according to embodiments of the present invention, energy is generated on the mobile structure on which the reader is disposed. The generated energy is stored on the mobile structure, and used to power the reader. In this manner, the need for power cables and/or extremely large batteries with regard to mobile structures is reduced or eliminated.

Embodiments of the present invention are described in further detail below. Such embodiments may be implemented in environment 100 shown in FIG. 1, with reader 104 shown in FIG. 2, and/or in alternative environments and RFID devices.

Energy Harvesting—General Concept

Energy harvesting systems are described herein for providing energy to various RFID system devices. Energy harvesting device generate energy in various ways, some examples of which are described in specific embodiments herein. The energy harvesting devices may be associated with a mobile/portable structure in various ways. For example, an energy harvesting device may be disposed directly on mobile structure, integrated into a mobile/portable structure or otherwise attached to it.

Various embodiments are described that feature a headset worn by an operator. Although the inventions described herein are particularly useful for powering headsets, they are not limited to headsets. Harvested energy can be used to power other devices, such as mobile/portable computers, communication devices, etc.

Embodiments for the energy harvesting systems can be implemented wherever convertible energy may be available. Systems can be implemented in a commercial or industrial environment, such as in a warehouse, a factory, a business, or store, and in a military or other non-commercial environment. For example, an RFID interrogator may be attached to a stationary structure or to a mobile structure. The energy generating systems enable deployment of devices that form RFID systems or are attached to RFID systems without the need for power cables and with potentially less space required for batteries.

Figure 4:
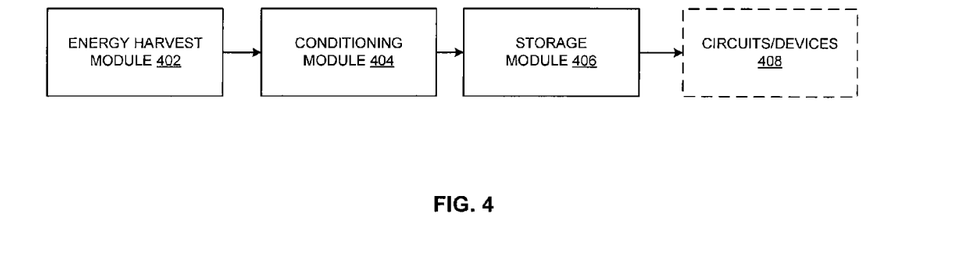
FIG. 4 is a general block diagram illustrating a system for harvesting energy and utilizing it to power circuits/devices.

FIG. 4 is a general block diagram illustrating a system for harvesting energy and utilizing it to power circuits/devices. Main system components include an energy harvesting module 402, an energy conditioning circuit 404, and an energy storage device 406. Energy accumulated and stored in storage device 406 can be used to power various circuits/devices 408, as needed. The energy storage device 406 is typically a rechargeable battery, but may alternatively be another type of battery or storage device otherwise known or future developed that can receive and store energy. Example materials/battery types for a rechargeable battery include Lithium (e.g., Li-ion, Li-polymer), Nickel-Cadmium (NiCD), Nickel-Metal Hydride (NiMH), Zinc-air, or other material. Further examples for energy storage device 406 include fuel cells, nano-enabled energy storage materials, capacitors, inertial energy storage devices, or other energy storage devices. In an embodiment, energy is transferred to energy storage device from energy harvesting device in the form of an electric current over a suitable wire, cable, or bundle of wires and/or cables. Energy storage device is disposed on mobile structure including being carried by, mounted on, or directly attached to mobile structure.

Energy harvesting module 402 may include one or more energy harvesting devices including but not limited to: solar array, piezo device, inertial magnetic device, RF energy harvester, etc. A plurality of energy harvesting devices can be coupled so as to cumulate their respective energy outputs (see FIG. 10).

Figure 7:
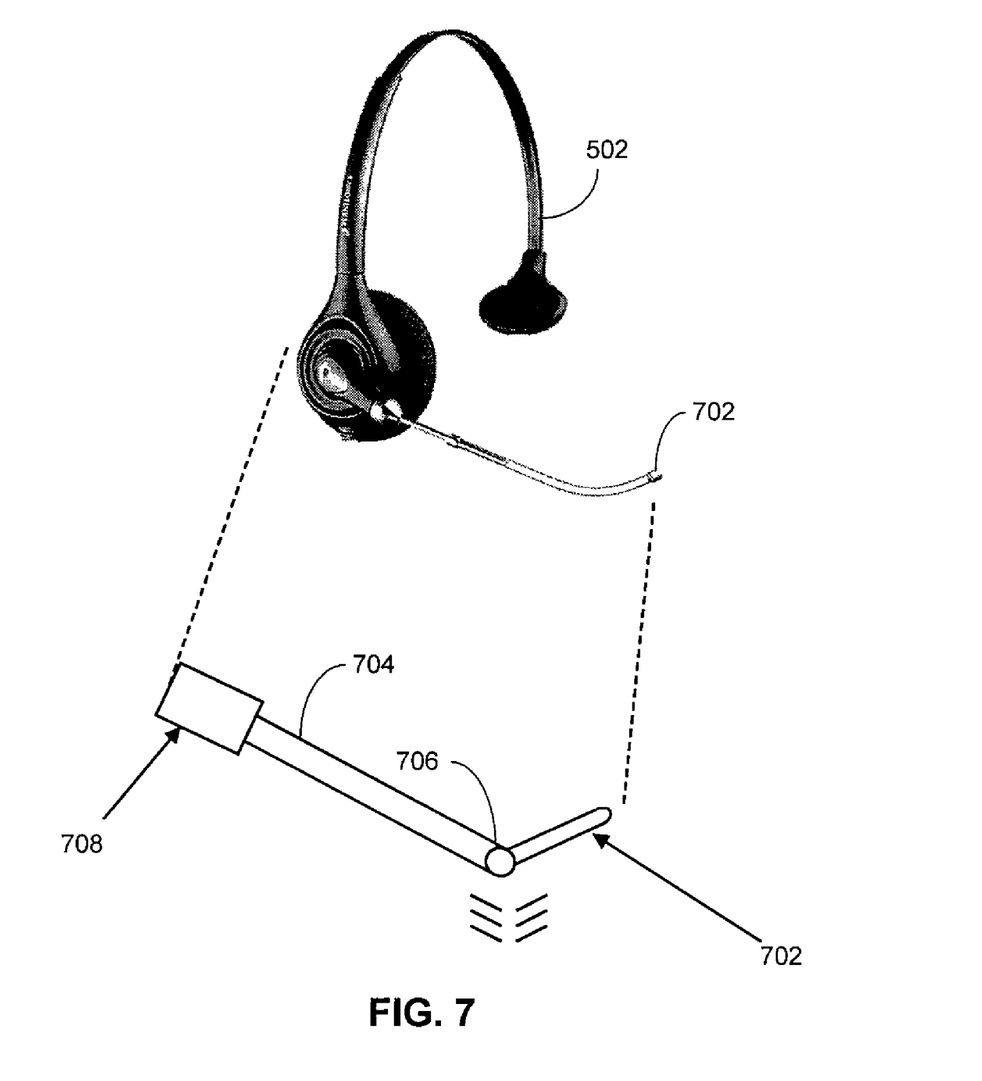
FIG. 7 is a schematic diagram of an embodiment of the invention illustrating harvesting mechanical energy using a piezo-electric device.

In embodiments, different types of energy harvesting devices can be used. For example, FIG. 7 shows a piezo device 708 as the energy harvesting device.

RF Energy Harvesting

Figure 5:
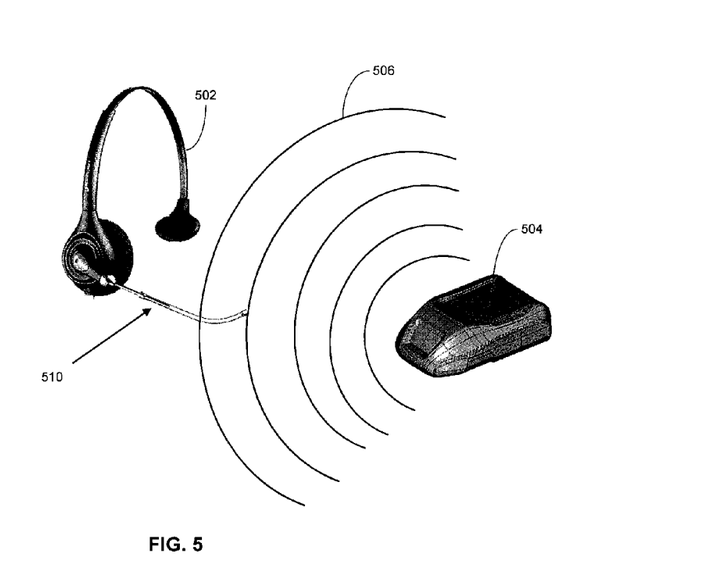
FIG. 5 is a schematic diagram of an embodiment of the invention illustrating harvesting energy from a signal transmitted by an RFID interrogator.

FIG. 5 is a schematic diagram of an embodiment of the invention illustrating harvesting energy from a signal transmitted by an RFID interrogator.

Figure 9:
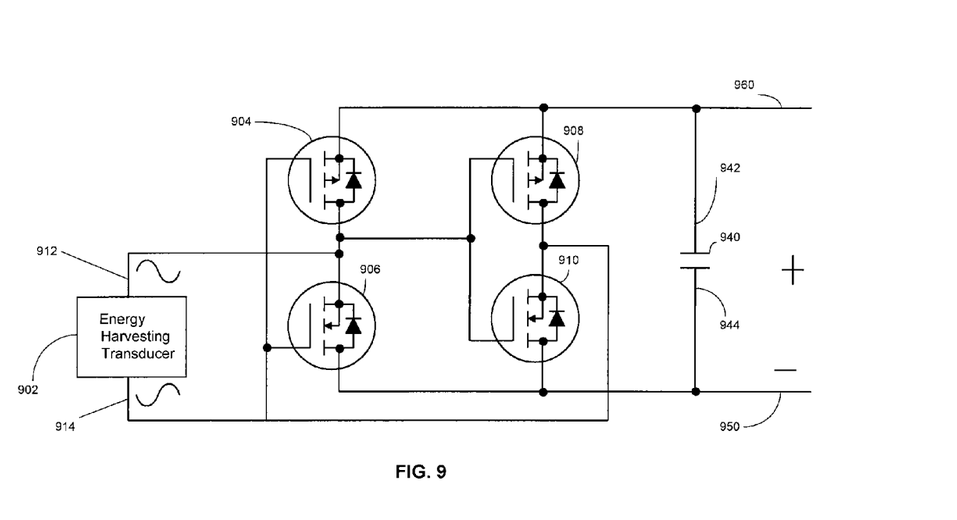
FIG. 9 is a schematic diagram of a low voltage rectifier circuit suitable for use with various energy harvesting transducer/devices.

A headset is worn by an operator. The operator may be carrying an RFID interrogator 504 that regularly transmits an interrogation signal 506. The operator may be carrying and operating a mobile computer with which the headset communicates. Headset 502 has an integrated antenna 510, in which a current is induced by signal 506. Current induced in antenna 510 may be conditioned by a rectifier circuit and accumulated in a storage device. One suitable rectifier circuit is shown in FIG. 9. Other types of rectifier circuits can be used as well. One suitable storage device is a capacitor or bank of capacitors. Such capacitors may be conventional capacitors, polymer capacitors or other suitable type of capacitor. Another suitable energy storage device is a battery. There are other suitable storage devices as well.

As an alternative, a conventional RFID tag can be integrated into headset 502. The charge pump 312 of the RFID tag (FIG. 3) can serve as the energy harvesting device.

Solar Array Energy Harvesting

Figure 6:
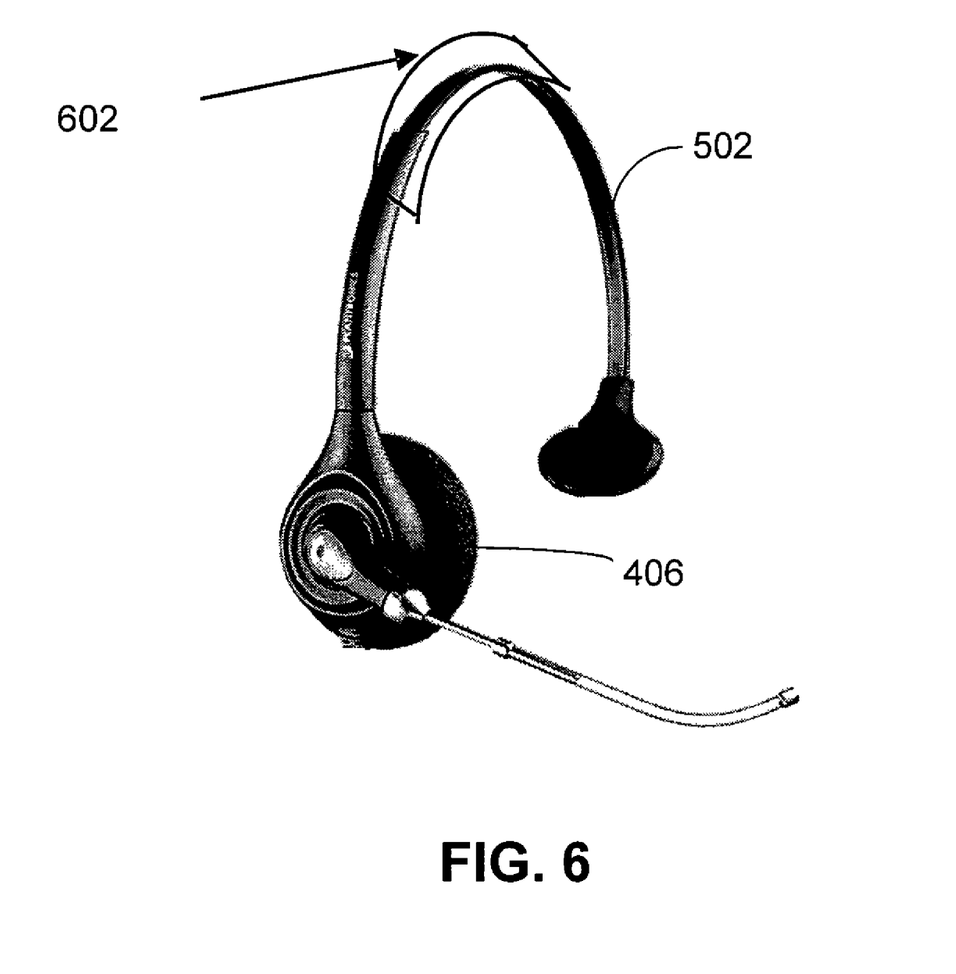
FIG. 6 is a schematic diagram of an embodiment of the invention illustrating harvesting energy from a photo-optical array.

FIG. 6 is a schematic diagram of an embodiment of the invention illustrating harvesting energy from a solar array, or more generally, an optical energy harvesting device. Headset 502 is fitted with an array of solar cells 602, preferably on an upper portion of the headset. Solar cells generate an electric current that is appropriately conditioned and stored in an energy storage device.

Optical energy harvesting converts light received by optical energy into a current, to generate energy to charge energy storage device 406. Optical energy harvesting device 1202 can incorporate a variety of optical energy harvesting materials/devices to generate energy. For example, optical energy harvesting device 1202 may include optical-to-electrical transducers such as solar cells (or photovoltaic cells) to convert light to energy, photodiodes, optoelectronic transducers, other light sensitive elements that convert light to a current, and any other optical energy harvesting materials/devices known to persons skilled in the relevant art(s). The optical-to-electrical transducers may be positioned on a mobile structure, such as headset 502, such that solar and/or other light energy is received in sufficient quantities to generate a charging current.

Piezo Electric Energy Harvesting

FIG. 7 is a schematic diagram of an embodiment of the invention illustrating harvesting mechanical energy using a piezo electric device. Piezoelectric materials exhibit a "piezoelectric effect," such that when they are subjected to a compressive or tensile stress, an electric field is generated across the material, creating a voltage gradient and subsequent current flow. Example suitable piezoelectric materials include polyvinylidene fluoride (PVDF) and lead zirconate titanate (PZT).

This embodiment is constructed and arranged to capture some of the vibratory energy of motion, such as for example, when an operator wearing headset 502 moves about. A headset microphone 702 is constructed in a manner that it acts like a moment arm. It is connected to a boom element 704 either directly or through a connecting element 706. Motion of the operator results in a vibration of microphone 702 and boom element 704. Boom element 704 drives a piezo-electric device 708 which generates an electric current as it mechanically shifts. The electric current is appropriately conditioned and stored.

Piezo device 708 could also be attached to a piece of movable machinery, such as, for example, a conveying device, such as a fork lift. Piezo device 708 can include a variety of vibration sensing/converting mechanisms, including piezoelectric transducers, magnets, and other mechanisms. Piezoelectric device 708 is attached to a moment arm formed by boom element 704. Piezoelectric device 708 is also anchored to headset 502. When headset 502 moves, the moment arm formed by boom 704 vibrates. This vibration deflects piezoelectric device 708. Piezoelectric device 708 converts this mechanical deflection to a voltage gradient that charges a storage device, such as a capacitor, that ultimately provides a trickle charge to energy storage device 406.

Piezoelectric device 708 may include a piezoelectric transducer and optionally, a rectifier, filter, DC-DC converter, etc. Some piezoelectric transducers output an AC (alternating current) current due to the piezoelectric effect caused by vibration. If such transducers are used, piezo device 708 should include a rectifier to convert the AC output current of the piezoelectric transducer into a DC (direct current) current signal. Such a rectifier may include one or more diodes arranged in a rectifier configuration. A filter can be included to smooth a rectified DC current signal. Such a filter may include a capacitor.

For further description regarding piezoelectric transducers and circuit 900, refer to Katz, Andrew, "Residential Piezoelectric Energy Sources," Delta Smart House, Jul. 21, 2004 (all pages) (http://delta.pratt.duke.edu/downloads/piezoelectrics_andrew.doc), which is incorporated by reference herein in its entirety.

Inertial Energy Harvesting

Figure 8:
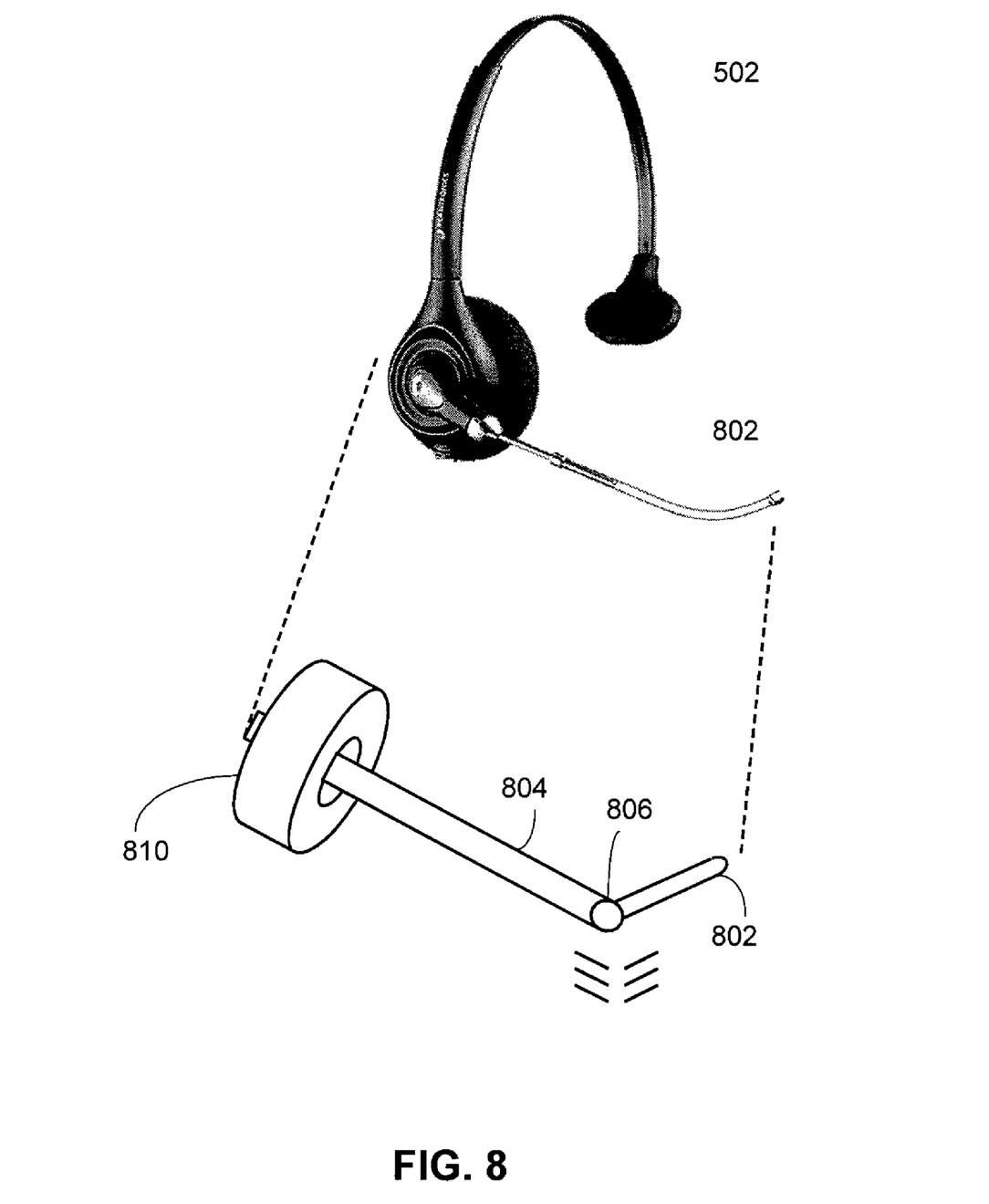
FIG. 8 is a schematic diagram of an embodiment of the invention illustrating harvesting mechanical energy using a magnetic induction of an inertial device.

FIG. 8 is a schematic diagram of an embodiment of the invention illustrating harvesting mechanical energy using an inertial device. This embodiment is constructed and arranged to capture some of the mechanical energy of motion when an operator wearing headset 502 moves about. A headset microphone 802 is constructed in a manner that it acts like a moment arm. It is connected to a boom element 804 either directly or through a connecting element 806. Boom element 804 is made of a magnetic material. Motion of the operator results in a vibration of microphone 802 and boom element 804. Boom element 804 is constructed and arranged so that its motion induces a current in an induction coil 810 as it mechanically shifts. The electric current induced in induction coil 810 is appropriately conditioned and stored.

The inertial harvesting device can be configured in a variety of ways to use magnetism to generate energy. For example, one or more magnets can be positioned near a coil of wire. When vibrations (such as due to the vibratory motion of boom element 804) cause relative motion between the magnetic material and induction coil, a current is generated in the wire of the coil that provides a trickle charge to a storage device (not shown in FIG. 8). The storage device may be an intermediate storage element, such as one or more capacitors, for holding charge prior to transfer to energy storage device 406, or may be energy storage device 406 itself.

Low Voltage Rectifier Circuit

FIG. 9 is a schematic diagram of a low voltage rectifier circuit suitable for use with various energy harvesting transducer/devices. It is assumed in this embodiment that energy is being harvested by an energy harvesting transducer 902 that provides an AC signal that must be rectified so that power can be stored in a battery, capacitor, or the like. Rectification is carried out by four insulated gate field effect transistors (IGFETs) 904, 906, 908 and 910. IGFETs are used because of their low-voltage properties. They can operate at the very low voltages generated by energy harvesting transducers already described, such as the piezo-electric transducer and inertial transducer. IGFETs 904, 906, 908 and 910 are connected in a rectifier circuit arrangement. Transducer 902 has outputs 912 and 914 characterized by an AC signal being formed between them. Gates of the IGFETS 904 and 906 are connected to node 914 of energy harvesting transducer 902. The drain of IGFET 904 and the source of IGFET 906 are connected to a node 912 of the energy harvesting transducer, and to the gates of IGFETs 908 and 910. Node 914 of the energy harvesting transducer is also connected to the drain of IGFET 908 and to the source of IGFET 910. A capacitor 940 has a first node 942 connected to the source of IGFET 908 and a second node 944 connected to the drain of IGFET 910, harvested power being made available across the first and second nodes of the capacitor. Capacitor 940 smoothes voltage swings across the outputs 950 and the positive output 960 of the rectifier circuit.

Multiple Energy Harvesting Devices

Figure 10:
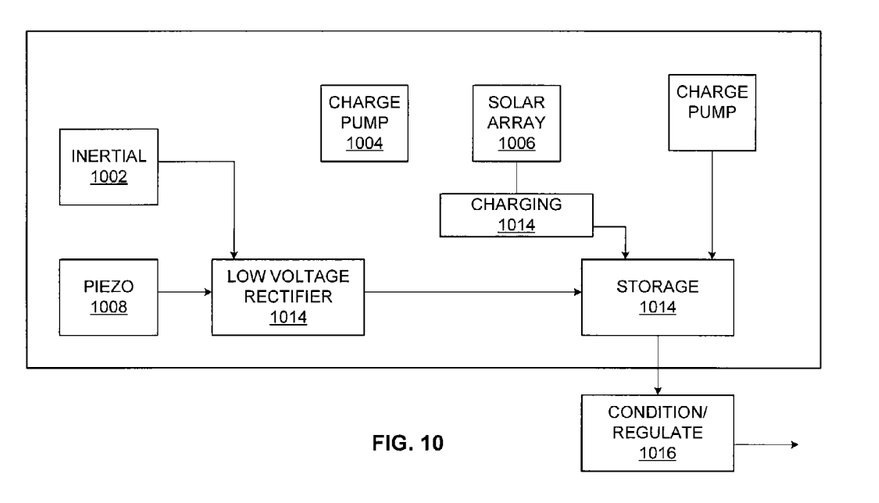
FIG. 10 is a general block diagram illustrating how power can be harvested from two or more devices and combined.

More than one energy harvesting device can be connected in a manner that allows power to be accumulated from them. FIG. 10 is a general block diagram of an embodiment illustrating how power can be harvested from two or more devices and combined. In this embodiment, power is harvested using an inertial device 1002, an RFID tag charge pump 1004, a solar array 1006 and a piezo device 1008. Power from each of these harvesting devices is conditioned as necessary before being stored in an energy storage device 1014. Power requiring low voltage rectification, such as from the inertial device 1002 and the piezo device 1008 is coupled to a low voltage rectifier 1010. An exemplary embodiment of a low voltage rectifier is shown in FIG. 9. Solar array 1006 is coupled to a charging circuit 1012. Storage device 1014 can be any suitable energy storage device. Examples include a rechargeable battery, a capacitor, a bank of capacitors, etc. Power stored in storage device 1014 can then be utilized as needed by coupling the storage device 1014 to an energy conditioning circuit 1016 such as a regulator. For example, conditioning circuit 1016 could be a buck boost regulator. Power stored in storage device 1014 can, for example, be used to power a headset, a computer to which a headset is tethered, a portable/mobile communication device to which a headset is tethered, an RFID interrogator, etc.

Position of Components

Figure 11:
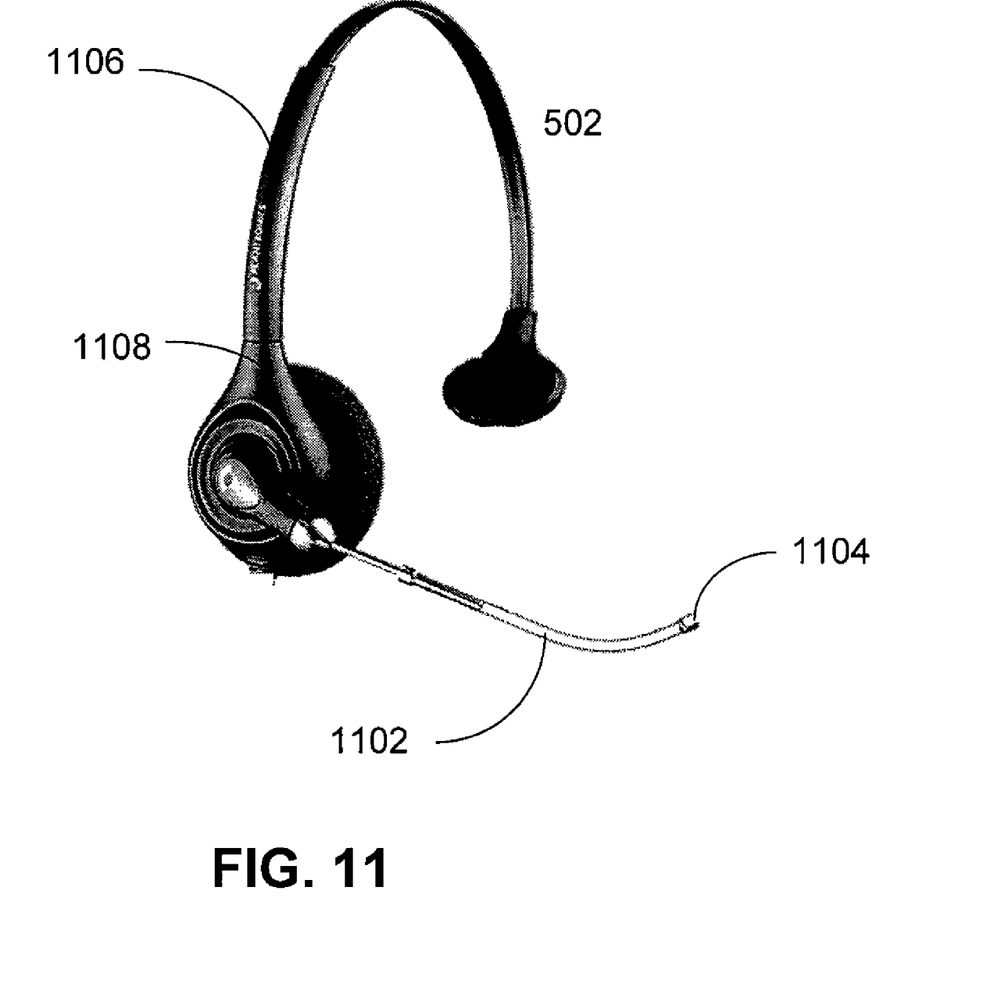
FIG. 11 is a schematic diagram illustrating how energy harvesting components can be placed in a worn headset.

FIG. 11 is a schematic diagram illustrating how energy harvesting components can be placed in a worn headset 502. One or more RF harvesting antennas can be placed in/integrated within a boom element 1102 supporting a microphone 1104. As an alternative, RF harvesting antennas can be placed in/integrated within a head clasp support structure 1106 of headset 502. Power storage devices can be placed in a body portion 1108 or the head clasp support structure 1106 of headset 502. Power conditioning circuits can also be located with the head clasp support structure 1106 or the body portion 1108 of headset 502.

Alternative Embodiments

Although the embodiments feature a headset, the principles of the invention apply to other mobile/portable devices as well. Examples of such mobile/portable structures include conveying devices, such as a forklift, warehouse box crushers, conveyor belts, cars, trucks, etc.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for providing supplemental power to a Radio Frequency Identification (RFID) interrogator in a headset in an RFID system, comprising:

mounting a microphone boom of the headset to a piezoelectric transducer, wherein a vibration of the boom deflects the piezoelectric transducer to generates a current due to the deflection;

integrating an RFID tag within the microphone boom of the headset, the RFID tag including a charge pump for harvesting energy from an antenna of the RFID tag, the energy obtained from any RFID interrogators in the RFID system;

charging an energy storage device disposed within a body of the headset with the generated energy from the RFID tag and the current from the piezoelectric transducer;

conditioning power from the energy storage device with a buck boost regulator disposed within a body of the headset; and powering the RFID interrogator of the headset with the conditioned power from the energy stored in the energy storage device.

2. The method of claim 1, wherein said generating comprises:

inducing a current in an antenna receiving a signal from any RFID interrogator in the RFID system; and conditioning the current induced in the antenna for storage in the energy storage device.

3. An arrangement for providing supplemental power to a Radio Frequency Identification (RFID) interrogator in a headset in an RFID system, comprising:

a microphone boom of the headset mounted to a piezoelectric transducer, wherein a vibration of the boom deflects the piezoelectric transducer to generates a current due to the deflection;

an RFID tag integrated within the microphone boom of the headset, the RFID tag including an energy harvesting device for harvesting energy from an antenna of the RFID tag, the energy obtained from any RFID interrogators in the RFID system;

an energy storage device disposed within a body of the headset constructed and arranged to store power harvested by the energy harvesting device and from the RFID tag and the current from the piezoelectric transducer; and a powering conditioning circuit disposed within a body of the headset for conditioning power from the energy storage device and providing conditioned power to the RFID interrogator of the headset.

4. An arrangement according to claim 3 wherein the energy storing device is a capacitor.

5. An arrangement according to claim 3 wherein the energy storing device is a battery.

* * * * *